United States Patent
Vecera et al.

(10) Patent No.: US 9,565,092 B2
(45) Date of Patent: *Feb. 7, 2017

(54) ENTERPRISE SERVICE BUS DEPLOYMENT AT THE LEVEL OF INDIVIDUAL SERVICES

(71) Applicant: Red Hat, Inc., Raleigh, NC (US)

(72) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 769 days.

This patent is subject to a terminal disclaimer.

(21) Appl. No.: 13/942,622

(22) Filed: Jul. 15, 2013

(65) Prior Publication Data

US 2013/0304912 A1 Nov. 14, 2013

Related U.S. Application Data

(63) Continuation of application No. 12/785,054, filed on May 21, 2010, now Pat. No. 8,489,733.

(51) Int. Cl.
*G06F 9/50* (2006.01)
*H04L 12/26* (2006.01)

(52) U.S. Cl.
CPC .......... *H04L 43/16* (2013.01); *G06F 9/50* (2013.01); *G06F 9/5005* (2013.01); *G06F 9/5083* (2013.01); *H04L 43/0876* (2013.01)

(58) Field of Classification Search
CPC ........ G06F 9/50; G06F 9/5005; G06F 9/5083; H04L 43/0876
See application file for complete search history.

(56) References Cited

U.S. PATENT DOCUMENTS

| | | | |
|---|---|---|---|
| 5,774,668 A | 6/1998 | Choquier et al. | |
| 6,928,477 B1 | 8/2005 | Leymann et al. | |
| 7,243,145 B1 | 7/2007 | Poortman | |
| 7,631,057 B2 | 12/2009 | Sportswood | |
| 8,281,071 B1 * | 10/2012 | Vohra | H04L 67/1097 711/114 |
| 8,489,733 B2 * | 7/2013 | Vecera | G06F 9/5083 709/224 |
| 8,856,800 B2 * | 10/2014 | Vecera | G06F 9/505 709/226 |
| 2006/0026599 A1 * | 2/2006 | Herington | G06F 9/5083 718/105 |
| 2006/0230407 A1 * | 10/2006 | Rosu | G06F 9/5088 718/105 |
| 2007/0266082 A1 | 11/2007 | McConnell et al. | |
| 2008/0301637 A1 | 12/2008 | Stark | |

(Continued)

*Primary Examiner* — Jeong S Park
(74) *Attorney, Agent, or Firm* — Lowenstein Sandler LLP

(57) ABSTRACT

A method and system for automatic ESB deployment at the level of individual services is described. In one method, a load balancer repeatedly monitors performance of individual services installed on ESB nodes. The performance is measured in view of utilization metrics of the individual services. The load balancer periodically determines whether the performance of one or more of the individual services falls below a performance threshold and deploys duplicate services for the one or more of the individual services that falls below the performance threshold at one or more additional ESB nodes without user intervention in response to the periodically determining.

16 Claims, 8 Drawing Sheets

(56) References Cited

U.S. PATENT DOCUMENTS

| | | | |
|---|---|---|---|
| 2009/0077251 A1* | 3/2009 | Brown | H04L 67/327 709/230 |
| 2009/0144404 A1* | 6/2009 | Wolman | G06F 9/5083 709/223 |
| 2010/0262695 A1 | 10/2010 | Mays et al. | |
| 2010/0281482 A1* | 11/2010 | Pike | G06F 9/44505 718/102 |
| 2011/0231362 A1* | 9/2011 | Attarde | G06F 11/3442 707/609 |
| 2011/0289206 A1 | 11/2011 | Vecera et al. | |
| 2011/0289512 A1 | 11/2011 | Vecera et al. | |
| 2012/0304175 A1* | 11/2012 | Damola | G06F 11/3419 718/1 |

* cited by examiner

ENTERPRISE SERVICE BUS DEPLOYMENT AT THE LEVEL OF INDIVIDUAL SERVICES

RELATED APPLICATIONS

This application is a continuation of parent U.S. application Ser. No. 12/785,054, filed May 21, 2010. This application is related to co-pending U.S. application Ser. No. 12/785,165, filed May 21, 2010. The entire contents of both are incorporated by reference.

TECHNICAL FIELD

Embodiments of the present invention relate to development of service oriented architecture (SOA), and more specifically, to automatic Enterprise Service Bus (ESB) deployment at the level of individual services and service-level ESB load balancing.

BACKGROUND

The Service Oriented Architecture (SOA) is a popular architectural paradigm for the development of software applications. For example, Web services provide the SOA to other applications via industry standard network, interfaces and protocols. The SOA is based on loosely-coupled and standards-based architectures. SOA is one approach to distributed computing that allows networked software resources to be leveraged.

An Enterprise Service Bus (ESB) is an underlying infrastructure for the SOA. The ESB implements the abstract design concept of the SOA. The ESB is an event-driven and standards-based messaging engine that provides services for more complex architectures. The ESB provides an infrastructure that links together services and clients to enable distributed applications and processes. The ESB allows systems to interact through standard transports, such as file transfer protocol (FTP) and hypertext transfer protocol (HTTP), and to provide SOA-based applications. The ESB provides the capabilities of message handling, filtering, data transformation, content-based routing, and message repositories. The ESB provides the above capabilities to a client using a service deployed on an ESB server at runtime that exchanges messages with the client.

The ESB server provides an effective way of processing various kinds of messages and events. When an organization wants a high-performing ESB, the organization will usually run multiple instances of the ESB server (also referred to herein as ESB instances or instances of the ESB) in a cluster configuration, such as illustrated in FIG. 1, and then implements a load balancing technique to distribute processing among the multiple instances. Load balancing is a technique to distribute workload evenly across two or more computers, network links, CPUs, hard drives, or other resources, in order to get optimal resource utilization, maximize throughput, minimize response time, and avoid overhead. In the ESB context, a conventional load balancer, such as a dedicated program, may allocate additional instances of the ESB in a cluster configuration as illustrated and described with respect to FIG. 1. As shown in FIG. 1, all of the ESB instances are the same and include all deployed services. This solution works but some nodes at which the ESB instances are hosted may have unused services deployed because not all the services are used equally. For example, the ESB instances execute all the deployed services (e.g., by calling one or more methods contained in the code that implements the services), regardless of whether the service will be utilized. The services may be system services including invocation support, routing (static/deterministic routing, content-based routing, rules-based routing, policy-based routing), mediation, messaging, process choreography, service orchestration, complex event processing, security (encryption and signing), reliable delivery, transaction management, management (e.g., monitoring, audit, logging, metering), and user defined services. When duplicating the services, each instance of the ESB supports all of the services.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
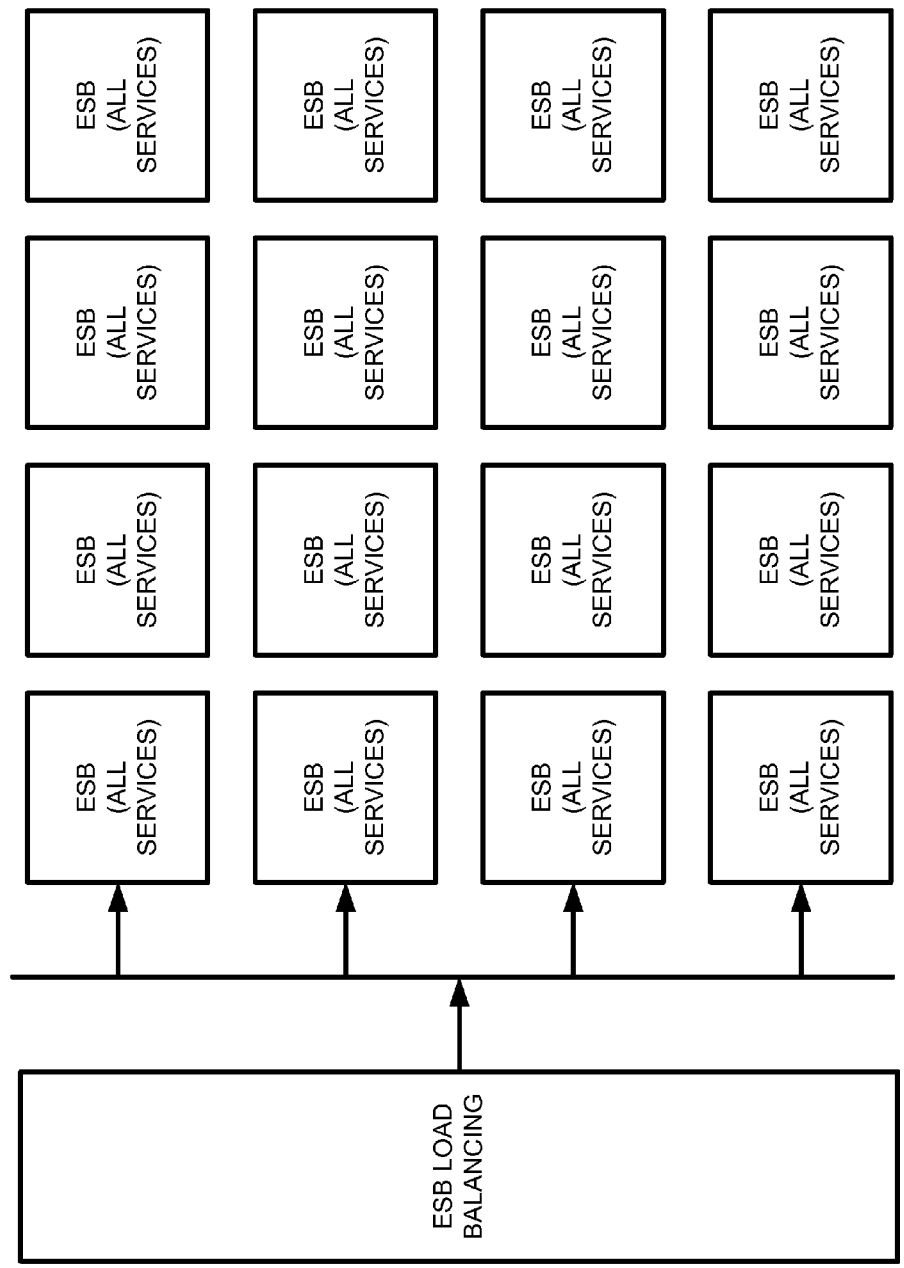
FIG. 1 illustrates an ESB load balancer of multiple instances of the ESB server with all services duplicated on each ESB server instance, according to a prior art embodiment.

A method and system for automatic ESB deployment at the level of individual services is described. In one embodiment, an ESB load balancer deploys a first ESB instance having multiple services, tracks performance of the first ESB instance, and automatically deploys a second ESB instance having a set of one or more duplicative services of less than all of the multiple services of the first ESB instance when the performance of the first ESB instance falls below a predetermined threshold. In one embodiment, the ESB load balancer regularly receives a report from the first ESB instance, the report containing a list of installed services and corresponding utilization of the node's resources where the first ESB instance is deployed. The ESB load balancer evaluates performance using the resource utilizations. For example, the ESB load balancer can compare the performance of all services, or of each of the individual services of the first instance to see if the collective performance falls below a threshold, or whether at least one of the services falls below the respective performance threshold. In one embodiment, the ESB load balancer deploys the second ESB instance with only the service that has the performance problem. In another embodiment, the ESB load balancer can deploy any combination of services at the second ESB instance, but less than all deployed services at the first ESB instance. Also, instead of using a custom defined load balancing with some apriori knowledge of the deployed services, the embodiments described herein provide an automatic method that allows a user to start the node with the required services, while the ESB deployment and load balancing may be done in the background, transparent to the user.

Embodiments of the present invention provide improved ESB load balancing. Instead of duplicating all services on each ESB instance, the embodiments described herein automatically deploy services at the level of individual services on the different ESB instance. For example, the embodiments described herein can duplicate just those services that have performance problems. By duplicating only the services that have performance problems, the node's resource, such as processing power, memory, or other hardware resources, can be used more effectively since this instance does not have any unused services using these resources in vain. The embodiments described herein can automatically deploy an ESB instance to each of the nodes with different combinations of services. The embodiments described herein can also automatically deploy a specific instance of a service. By automatically allocating ESB instances at the level of individual services, the ESB clustering configurations can increase performance, while lowering costs for the hardware resources, allowing customers to use the cluster configuration more effectively. The embodiments described herein may also increase the overall throughput and better utilize distributed system resources across the enterprise.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "deploying," "tracking," "receiving," "detecting," "forwarding," "executing," "deploying," "defining," "sending," "presenting," "signing," "publishing," "approving," "authenticating," "archiving," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

Figure 2A:
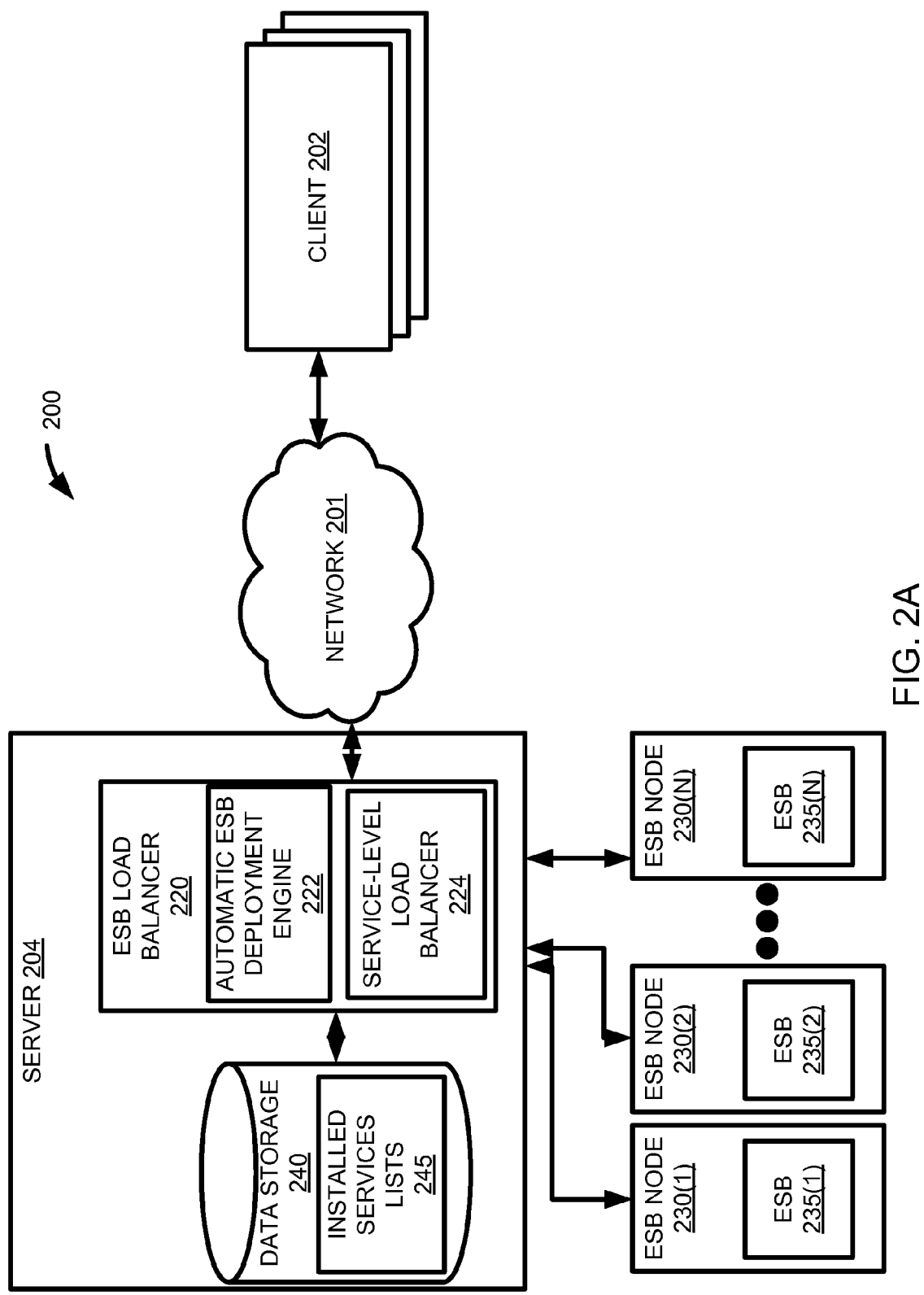
FIG. 2A is a block diagram of exemplary network architecture in which embodiments of an ESB load balancer, having an automatic ESB deployment engine and a service-level load balancer, may operate.

FIG. 2A is a block diagram of exemplary network architecture 200 in which embodiments of an ESB load balancer 220, having an automatic ESB deployment engine 222 and a service-level load balancer 224, may operate. The network architecture 200 may include a server 204 (also referred to as a middleware server or an application server) and one or more clients 202 connected via a network 201, which may be a private network (e.g., a local area network (LAN), wide area network (WAN), intranet, etc.) or a public network (e.g., the Internet). The server 204 may be one or more machines including one or more server computers, gateways, or other computing systems. The server 204 is coupled to multiple ESB nodes 230(1)-(N), where N is a positive integer greater than one. The ESB nodes 230(1)-(N) may be one or more machines including one or more server computers, gateways, or other computing systems. The server 204 deploys one of the ESB instances 235(1)-(N) on each of the ESB nodes 230(1)-(N), respectively. However, unlike conventional load balancing, in one embodiment, the server 204 includes the automatic ESB deployment engine 222, which automatically deploys the ESB instances to the ESB nodes 230 with less than all of the services. In one embodiment, after the automatic ESB deployment engine 222 deploys the ESB instances, the ESB load balancer 220 can forward the incoming messages to the appropriate ESB instances using any load balancing technique as would be appreciated by one of ordinary skill in the art having the benefit of this disclosure. For example, the ESB load balancer 220 can distribute the incoming messages on a first-come-first-serve basis, or on a round robin basis, alternating between each of the ESB instances, for examples. In another embodiment, the ESB load balancer 220 includes the service-level load balancer 224 that allows the ESB load balancer 220 to forward incoming messages received from the client 202 to the appropriate ESB instance as depicted in FIG. 2. When the server 204 includes both the automatic ESB deployment engine 222 and the service-level ESB load balancer 224, the server 204 can deploy ESB instances automatically, as well as forward incoming messages to the appropriate ESB instance.

In another embodiment, the ESB load balancer 220 includes the service-level load balancer 224, but not the automatic ESB deployment engine 222. In this embodiment, the ESB load balancer 220 can deploy the ESB instances using techniques other than those described with respect to the automatic ESB deployment engine 222, as would be appreciated by one of ordinary skill in the art having the benefit of this disclosure, such as deploying ESB instances with all duplicate services as described with respect to FIG. 1. Embodiments of ESB instances deployment are described in more detail below with respect to FIGS. 2B, 3, 4A, and 5. Embodiments of incoming message forwarding are described in more detail below with respect to FIGS. 2C, 3, 4B, and 5.

The client 202 may be a computing device such as, for example, a desktop computer, laptop computer, server, cellular phone, personal digital assistant (PDA), etc. In one embodiment, the client 202 is a server of an enterprise, but is a "client" with respect to the server 204. The client 202 interacts with the server 204 by exchanging messages via standard protocols, e.g., FTP and HTTP. The client 202 runs client applications to generate messages that are to be processed by services deployed on the ESB instances at the ESB nodes 230(1)-(N). The client 202 may also include a graphic user interface (GUI) for viewing the results provided from the ESB instances. Each of the ESB instances executes one or more deployed services (e.g., by calling one or more methods contained in the code that implements the services). The services may be system services including invocation support, routing (static/deterministic routing, content-based routing, rules-based routing, policy-based routing), mediation, messaging, process choreography, service orchestration, complex event processing, security (encryption and signing), reliable delivery, transaction management, management (e.g., monitoring, audit, logging, metering), and user defined services. Through the server 204 and ESB node 230, users of the client 202 can send requests and receive the information provided by the deployed services at each of the ESB instances 235.

In the depicted embodiment, the server 204 is coupled with data storage 240. The data storage 240 may include one or more storage devices (e.g., the computer-readable medium described above) that are local to the server 204 and/or remote from the server 204. The data storage 240, which is coupled to the ESB load balancer 220, receives service usage data of the services installed at the ESB instances 235. The service usage data can also be used to determine performance data, which can also be stored in the data storage 240, associated with the performance of the ESB instances 235 or the individual performances of the services installed in each of the ESB instances 235. For example, each of the ESB instances 235 regularly reports a list of installed services and corresponding utilizations of the respective node's resources, such as the node's computing and memory resources. In one embodiment, the automatic ESB deployment engine 222 can use this data to determine performance information and to automatically allocate ESB instances on the level of individual services based on the performance information as described herein. In another embodiment, the service-level load balancer 224 can use this data (e.g., service usage data) to determine where to forward an incoming message. For example, when the service-level ESB load balancer 224 receives an incoming message, the load balancer 224 searches the data to find the least-used service of a given type (e.g., the type indicated in the incoming message or associated with the incoming message) and forwards the message to the corresponding ESB instance.

In one embodiment, the client 202 runs a client application that generates a message and the client 202 sends the message to the server 204, such as to an input message queue on the server 204. The service-level ESB load balancer 224 determines which of the ESB instances should process the incoming message, according to the embodiment described herein, and sends the incoming message to an input message queue on the respective ESB node 230. The deployed service "listens" or checks the input message queue of the respective ESB node 230 and processes the messages in the queue targeted to the particular deployed service.

The server 204 may provide various features, such as clustering, load balancing (as described herein), distributed catching and deployment, failover, and the like. In one embodiment, the server 204 is an application server. In another embodiment, the server is a web server. In one embodiment, the server 204 is a management server for managing the middleware environment. The server 204 can interact with the ESB nodes 230 to allow it to act as the central repository for convent updates, raw management data, and to act as the central messaging bus for all monitoring and distributing incoming messages and events. The server 204 may provide a user interface, such as a management console, to allow an administrator to manage the ESB instances, the ESB nodes 230 (e.g., also referred to as nodes), as well as to configure the ESB load balancer 220. In one embodiment, the server 204 runs a JBoss Operation Network (JON) server and the ESB nodes each run a JON ESB node. The JBoss Operations Network (JON) is a single, integrated management platform that delivers centralized systems management and simplifies development, testing, deployment, and monitoring for JBoss Enterprise Middleware. Alternatively, other types of servers and nodes can be used.

Figure 2B:
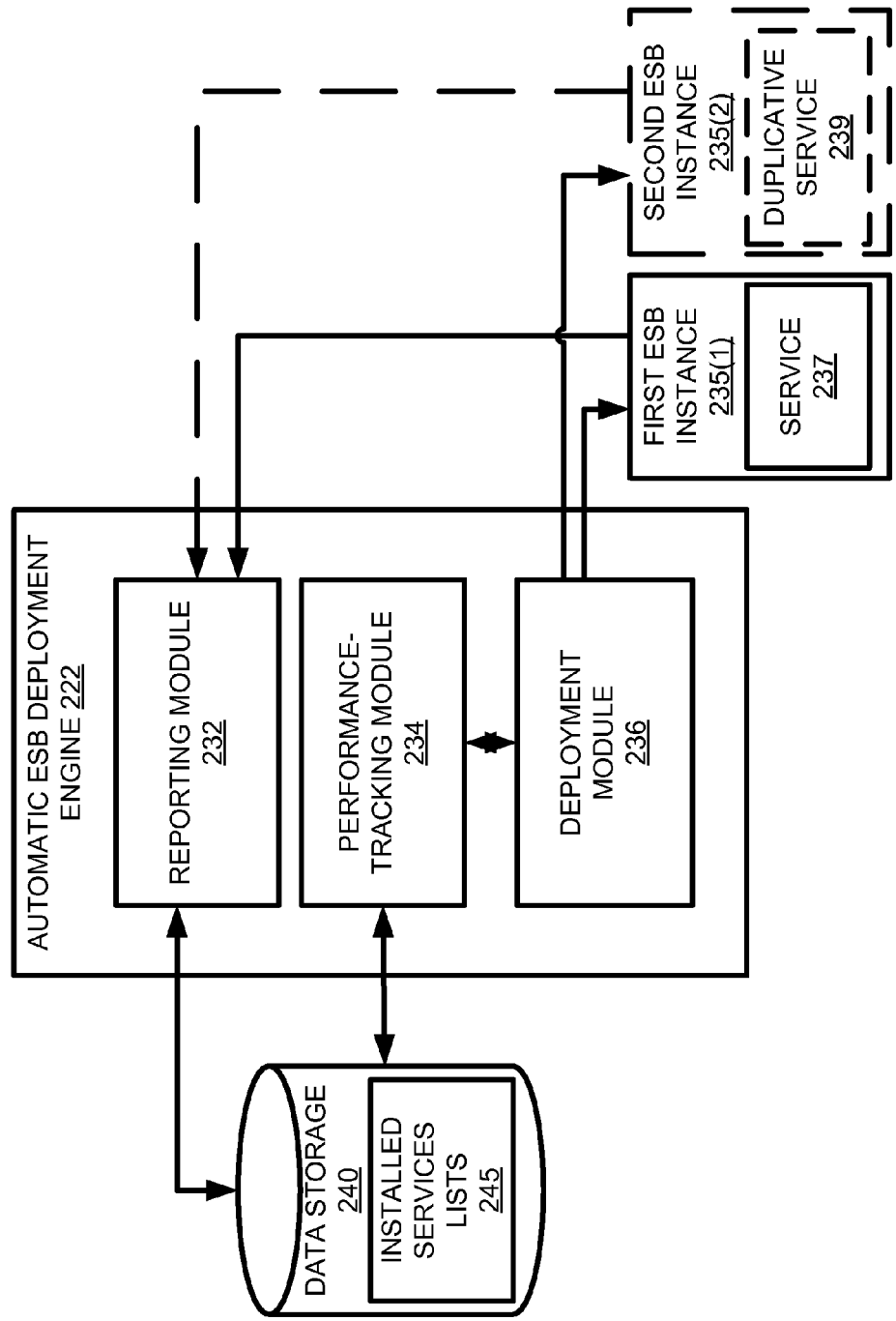
FIG. 2B is a block diagram of the automatic ESB deployment engine of FIG. 2A according to one embodiment.

FIG. 2B is a block diagram of the automatic ESB deployment engine 222 of FIG. 2A according to one embodiment. The automatic ESB deployment engine 222 includes a reporting module 232, a performance tracking module 234, and a deployment module 236. The reporting module 232 regularly receives a report from the first ESB instance 235(1). The regular report contains a list of the services installed on the ESB node hosting the first ESB instance 235(1). The list may also include the utilizations of the ESB node's resources by each of the installed services. The reporting module 232 stores the reports as the installed services list(s) 245 in the data storage 240.

The performance-tracking module 234 may track the performance of the ESB instances, or the performance of each of the services installed at each of the ESB instances. For example, in one embodiment, the performance-tracking module 234 determines a performance of the first ESB instance 235(1). In another embodiment, the performance-tracking module 234 determines a performance for each of the installed services of the first ESB instance 235(1), including the service 237. In one embodiment, the performance-tracking module 234 compares the performance of the first ESB instance 235(1) against the predetermined threshold to determine if the first ESB instance 235(1) falls below the respective performance threshold. In another embodiment, the performance-tracking module 234 compares the performance of each of the services against a performance threshold, which may be the same or different thresholds for each of the different types of services. In this case, the performance of the first ESB instance 235(1) falls below the predetermined threshold when at least one of the services falls below the respective performance threshold. The deployment module 236, in response to the determination at the performance-tracking module 234, automatically deploys a second ESB instance 235(2) having the first service when the performance of the first service falls below the predetermined threshold. For example, if the performance-tracking module 234 determines that the performance of the service 237 of the first ESB instance 235(1) falls below the performance threshold, the deployment module 236 automatically deploys the second ESB instance 235(2) with at least service 239 that duplicates service 237.

In one embodiment, the deployment module 236 deploys the second ESB instance 235(2) having only the duplicative service 239 when the service 237 falls below the performance threshold. In another embodiment, the deployment module 236 deploys the second instance having only the duplicative service 239 when the first ESB instance 235(1) falls below the predetermined threshold. In another embodiment, the deployment module 236 deploys the second ESB instance 235(2) with the duplicative service and one or more additional services. These additional services may be duplicative services of the services on the first ESB instance 235(1), or alternatively, they may be different services than those on the first ESB instance 235(1).

Figure 3:
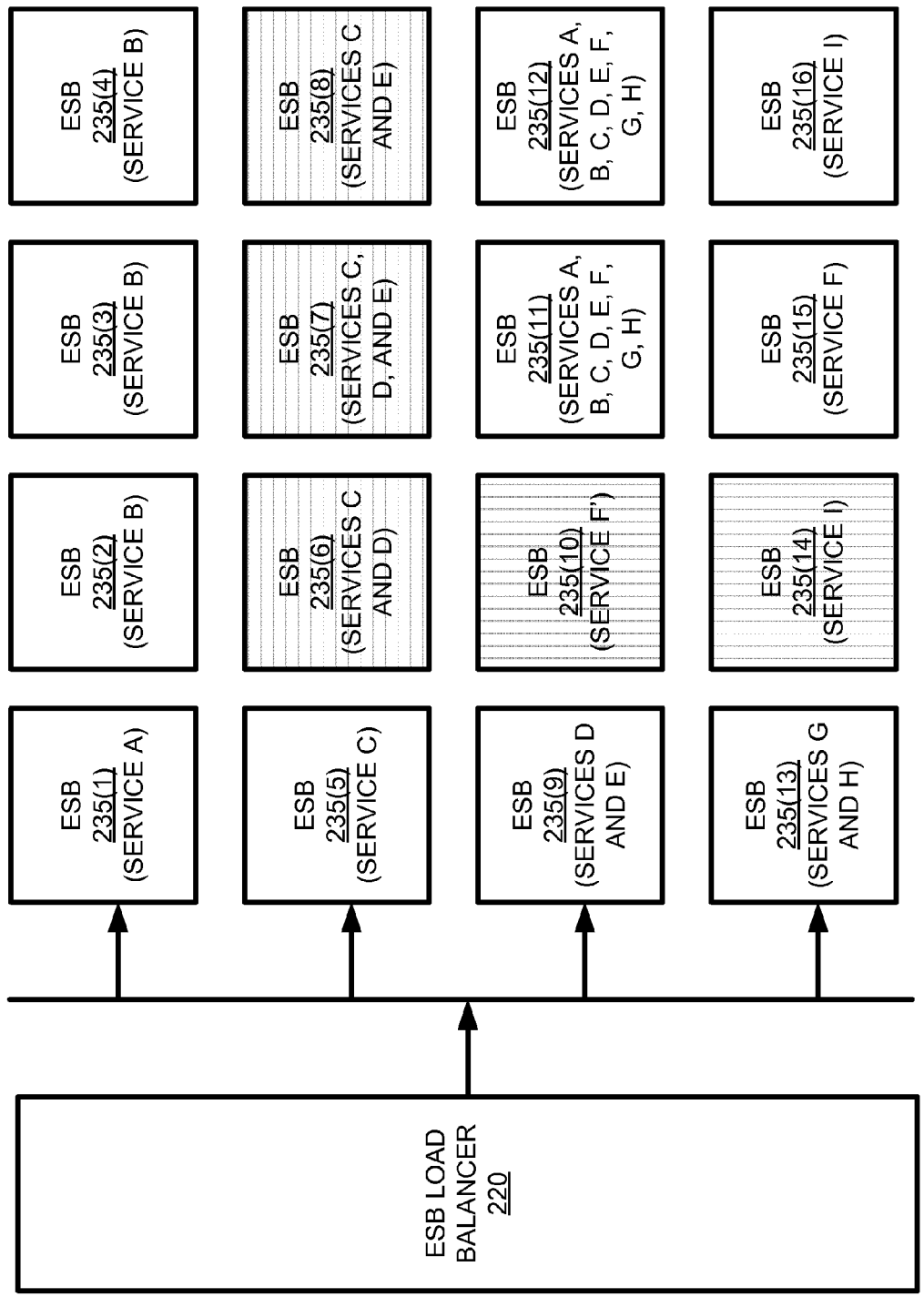
FIG. 3 illustrates the ESB load balancer for multiple instance of the ESB server with less than all services duplicated on each ESB server instance according to one embodiment.

In another embodiment, once the second ESB instance 235(2) has been deployed, the reporting module 232 can start receiving regular reports from the second ESB instance 235(2) as well. The performance-tracking module 234 can also start tracking the performance of the second ESB instance 235(2). In response, the deployment module 236 may deploy a third ESB instance 235(3) (not shown in FIG. 2B) with a set of one or more duplicative services of less than all of the services of the first or second ESB instances when the performance of the first and/or second ESB instance falls below the respective thresholds or when services of these instances fall below the respective performance thresholds. For example, the deployment module 236 can deploy a second duplicative service of the duplicative service 239. For another example, the second ESB instance 235(2) may have the duplicative service 239 and a second service, and the third ESB instance 235(3) may have the same duplicative service 239 and a third service, which is different than the second service. In one embodiment, the set of duplicative services deployed on the second ESB instance 235(2) are the same set of duplicative services deployed on the third ESB instance 235(3). In another embodiment, different sets of one or more services can be deployed on the second and third ESB instances. FIG. 3 illustrates various examples of different combination of different types of services being deployed on multiple nodes. Alternatively, the deployment module 236 can automatically deploy additional ESB instances having any combination of services at the level of individual services, instead of duplicating all services on each ESB instance as done conventionally.

It should also be noted that embodiments of the automatic ESB deployment engine 222 may be implemented without the service-level ESB load balancer 224. For example, in one embodiment, the automatic ESB deployment engine may include a load balancer that receives an incoming message to be processed by a given type of service and forwards the incoming message to one of the ESB instances on a first-come-first-serve basis, or on a round robin basis, alternating between each of the ESB instances, for examples. In another embodiment, the automatic ESB deployment engine 222 is used in connection with the service-level ESB load balancer 224 as described with respect to FIG. 2C.

Figure 2C:
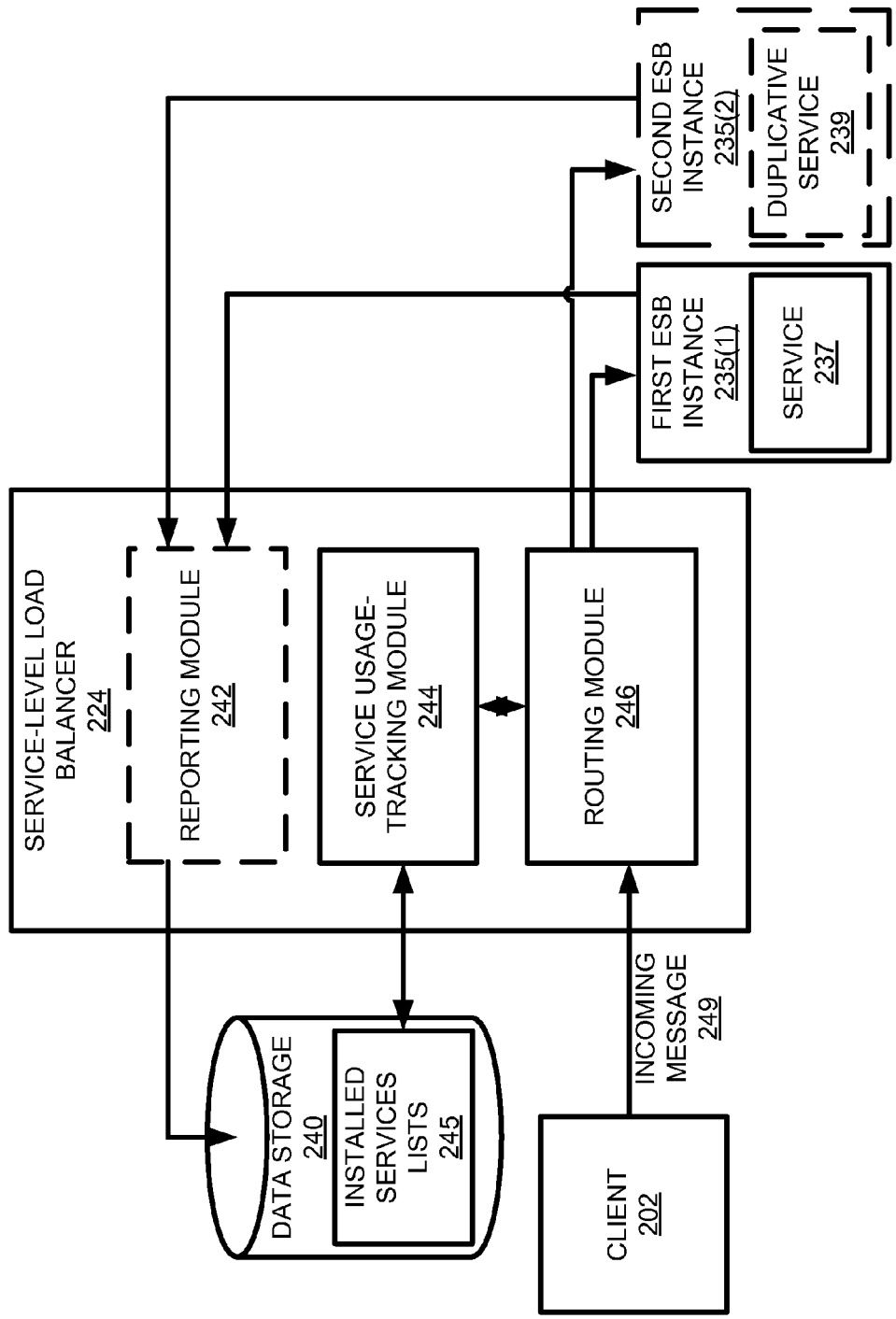
FIG. 2C is a block diagram of the service-level load balancer of FIG. 2A according to one embodiment.

FIG. 2C is a block diagram of the service-level load balancer 224 of FIG. 2A according to one embodiment. The service-level ESB load balancer 224 includes a reporting module 242, a services usage module 244, and a routing module 246. In one embodiment when the ESB load balancer 220 includes both the services-level load balancer 224 and the automatic ESB deployment engine 222, the reporting module 242 and reporting module 232 can be the same module. Like the reporting module 232, the reporting module 242 regularly receives a report from each of the nodes, such as the ESB nodes having the first ESB instance 235(1) and the second ESB instance 235(2), respectively. The regular reports contain a list of the services installed on the ESB node hosting the respective ESB instance 235. The list may also include the utilizations of the ESB node's resources by each of the installed services of the respective ESB instance. The reporting module 242 stores the reports as the installed services list(s) 245 in the data storage 240.

In the depicted embodiment, the routing module 246 receives an incoming message 249 for a given type of service from the client 202, and in response, the service usage-tracking module 234 searches the installed services lists 245, stored in the data storage 240, for the installed service of the given type that has the lowest resource utilization. The installed service having the lowest resource utilization may be the service having the least-used service. In response, the routing module 246 forwards the incoming message to the respective node hosting the service that has the lowest resource utilization. For example, the service usage-tracking module 244, using the installed service lists 245, determines that the duplicative service 239 has a lower resource utilization than the service 237, and the routing module 246 forwards the incoming message 249 to the second ESB instance 235(2) to be processed by the duplicative service 239. Although the depicted embodiment illustrates two ESB instances and two services, in other embodiments more ESB instances may be deployed with this type of service.

As describe above, in one embodiment, the first ESB instance 235(1) may have a fixed number of services, including the service 237, and the second ESB instance 235(2) may have a set of one or more duplicative services, including duplicative service 239, the set including less than all of the fixed number of services of the first ESB instance 235(1). In addition, as described above, the duplicative service 239 may be the only service deployed on the second ESB instance 235(2). Alternatively, the second ESB instance 235(2) may have the duplicative service 239 as well a second service. In another embodiment, when the automatic ESB deployment engine 222 deploys a third ESB instance (not illustrated in FIG. 2C), the third ESB instance may have the duplicative service, the duplicative service and a third service, which is different than the second service, or another combination of services.

In one embodiment, the service usage-tracking module 244 determines which ESB instance has the least-used service by determining which of the multiple nodes hosts a service of the given type, and determines which of those determined nodes has the lowest resource utilization. In one embodiment, the service usage-tracking module 244 determines which of those nodes has the lowest current utilization by the services of the respective node collectively. In another embodiment, the service usage-tracking module 244 determines which of those nodes has the lowest current utilization by the services of the respective node individually.

FIG. 3 illustrates the ESB load balancer 220 for multiple ESB instances with less than all services duplicated on each ESB instance according to one embodiment. Instead of having all of the services duplicated on each ESB instance as shown in FIG. 1, in this embodiment, the ESB load balancer 220 duplicates just the services that have performance problems as described herein. By duplicating only the services that have performance problems, the node's resource, such as processing power, memory, or other hardware resources, can be used more effectively since there instance does not have any unused services using these resources in vain.

In the depicted embodiment, instead of having all ESB instances have all services (e.g., SOAP, XSLT, XPath, RegEx, Proxy, Registry, Smooks, and CEP in each duplicate ESB instance, as shown in FIG. 1), each ESB instance is deployed to an ESB node and can have a set of one or more services or duplicative services for less than all of the services provided by an ESB instance having all services. For example, as depicted in the following table, the ESB instances 235(1)-235(16) can have any number of combinations based on the performance of the services. In addition, the numbers for resource utilization are exemplary, and may range between 5-90% for CPU load, and between 900-2000 KB for memory usage, but may be as high as units of GB (e.g., 4 GB). The rows in the following table may represent the information sent in the regular reports by each of the ESB instance. Each report includes a list of each of the installed services at the respective node, and the utilization of the respective node's resources.

tiple formats are supported for both source type and result type. The Smooks for SAML service may be a specific Smooks service for inserting a security token (e.g., SAML token) into a message header. The CEP (Complex Event Processing) service may be used to process multiple events with the goal of identifying the meaningful events within the event cloud. CEP employs techniques such as detection of complex patterns of many events, event correlation and abstraction, event hierarchies, and relationships between events such as causality, membership, timing, and event-driven processes. The services described herein are merely exemplary services that can be deployed. Alternatively, other types of services may be deployed, such as other types of transformation services, registry services, other services used in the ESB context, and other services that are used in other types of middleware servers. In other embodiments, other types of services can be automatically deployed at the level of individual services by the automatic ESB deployment engine 222, and the messages can be forwarded to the appropriate one of these services using the service-level ESB load balancer 224.

| ESB Instances | Installed Services: | Resource Utilization: |
| --- | --- | --- |
| ESB instance 235(1) | SOAP | % CPU: 5; Memory Usage: 956K |
| ESB instance 235(2) | CEP | % CPU: 23; Memory Usage: 5,332K |
| ESB instance 235(3) | CEP | % CPU: 55; Memory Usage: 9,762K |
| ESB instance 235(4) | CEP | % CPU: 62; Memory Usage: 12,700K |
| ESB instance 235(5) | XSLT | % CPU: 22; Memory Usage: 4,404K |
| ESB instance 235(6) | XSLT, RegEx | % CPU: 66; Memory Usage: 35,235K |
| ESB instance 235(7) | XSLT, XPath, RegEx | % CPU: 75; Memory Usage: 43,440K |
| ESB instance 235(8) | XSLT, XPath | % CPU: 44; Memory Usage: 27,243K |
| ESB instance 235(9) | XPath, RegEx | % CPU: 28; Memory Usage: 12,756K |
| ESB instance 235(10) | Smooks for SAML | % CPU: 43; Memory Usage: 26,569K |
| ESB instance 235(11) | SOAP, XSLT, XPath, RegEx, Proxy, Registry, Smooks, CEP | % CPU: 90; Memory Usage: 75,354K |
| ESB instance 235(12) | SOAP, XSLT, XPath, RegEx, Proxy, Registry, Smooks, CEP | % CPU: 72; Memory Usage: 43,340K |
| ESB instance 235(13) | Proxy, Registry | % CPU: 26; Memory Usage: 5,123K |
| ESB instance 235(14) | Discount CBR | % CPU: 13; Memory Usage: 10,322K |
| ESB instance 235(15) | Smooks | % CPU: 5; Memory Usage: 956K |
| ESB instance 235(16) | Registry | % CPU: 10; Memory Usage: 8,567K |

The services listed above are merely exemplary services that may be deployed. The SOAP (Simple Object Access Protocol) service may perform various services for exchanging structured information for the SOAP protocol. The XSLT (XSL transformations) service may be used to transform XML documents into other types of documents (e.g., XML, RTF, etc). XSLT service is often used to convert XML data into HMTL or XHTML documents. The XPath (XML Path Language) service may be used to select nodes for an XML document or to compute values (e.g., strings, numbers, or Boolean values) from the content of an XML document. The RegEx (regular expression) service provides a concise and flexible means for matching strings of text, such as particular characters, words, or patterns of characters. A regular expression is written in a formal language that can be interpreted by a regular expression processor, such as a program that either serves as a parser generator or examines text and identifies parts that match the provided specification. The Proxy service may act as an intermediary for request from clients seeking resources from other servers. The Registry service may be used to locate a services' input gate/interface. The Registry server may translate the logical name of the service into its physical location and details necessary for the communication. The Smooks service may be an XML message transformer based on XSLT that helps transforming data from one format to another format. Mul- In another embodiment, the ESB load balancer 220 can automatically deploy an ESB instance to each of the nodes with different combinations of services like those illustrated in the ESB instances with horizontal hashes (235(6)-235(8)). All of the ESB instances have XSLT service, but the first ESB instance also has RegEx, and a second ESB instance also has XPath, while a third ESB service shares all three services. In another embodiment, the ESB load balancer 220 automatically deploys a specific instance of a service, like those illustrated in the ESB instances with vertical hashes (235(10) and 235(14)). For example, the Smooks service may insert a SAML token into a message header. In this ESB instance, this specific XSLT transformation can be directly translated to bytecode to gain a high-performing service. It should be noted that the specific instance of this service may come at the price that this service cannot be used for other types of transformation.

Since not all the services are deployed on each of the ESB instances, as done conventionally, the ESB load balancer 220 needs to know where the services are located. In one embodiment, the ESB load balancer 220 can determine which services are installed on each of the nodes using the regular reports as described herein. In another embodiment, the ESB load balancer 220 can track the nodes that have the Registry service deployed, from which the ESB load balancer can obtain endpoints to other services. Alternatively, other tracking techniques may be used to track the locations of the available services.

Figure 4A:
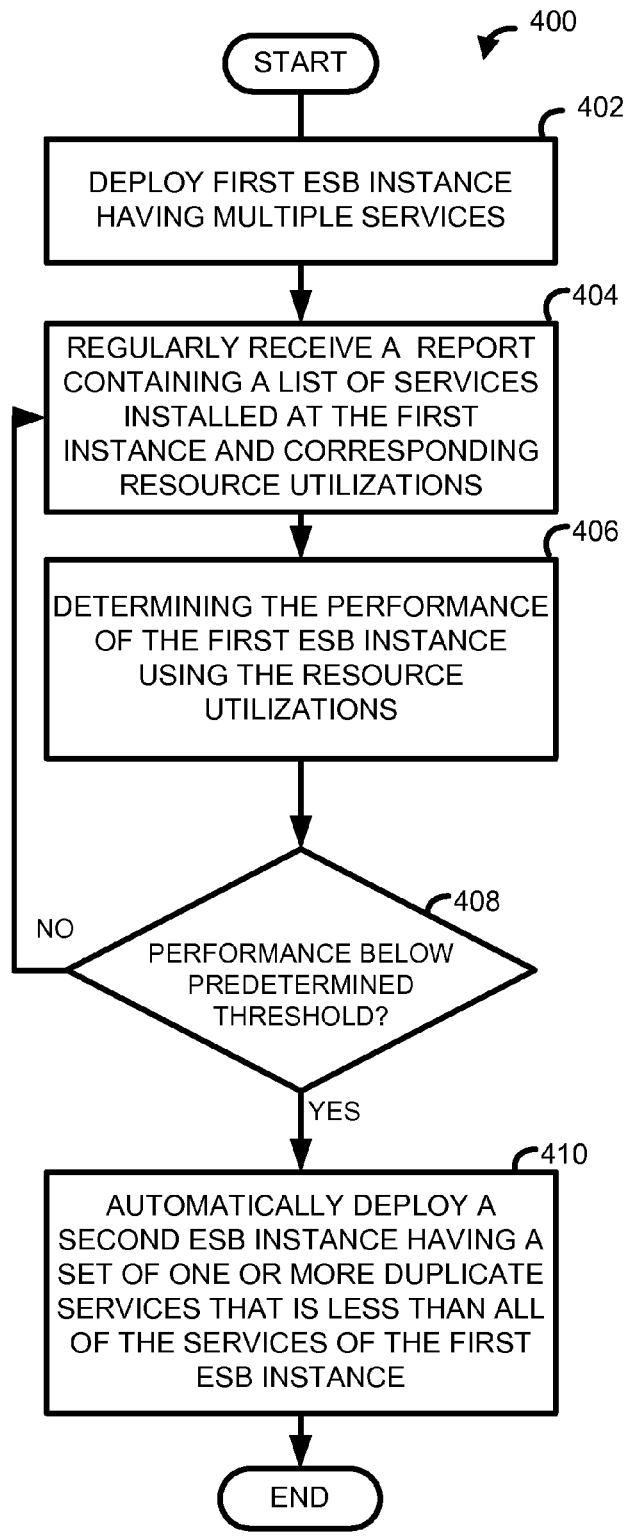
FIG. 4A is a flow diagram of one embodiment of a method of automatic ESB deployment at the level of individual services.

FIG. 4A is a flow diagram of one embodiment of a method 400 of automatic ESB deployment at the level of individual services. The method 400 is performed by processing logic that may comprise hardware (circuitry, dedicated logic, etc.), software (such as is run on a general purpose computing system or a dedicated machine), firmware (embedded software), or any combination thereof. In one embodiment, the automatic ESB deployment engine 222 of FIG. 2A performs the method 400. In another embodiment, the ESB load balancer 220 of FIG. 2A performs the method 400. Alternatively, other components of the server 204 can perform some or all of the operations of method 400.

Referring to FIG. 4A, processing logic begins with deploying a first ESB instance having multiple services (block 402). Next, the processing logic tracks the performance of the first ESB instance. In the depicted embodiment, the processing logic tracks the performance by regularly receiving a report from the first ESB instance, the regular report containing a list of the multiple services installed on an ESB node hosting the first ESB instance and corresponding utilizations of the node's resources by each of the multiple services (block 404). Next, the processing logic determines the performance of the first ESB instance using the corresponding utilizations of the node's resources by each of the services (block 406), and determines if the performance of the first ESB instance is below the predetermined thresholds (block 408). Although the depicted operations of block 404 and 406 track the performance of the first ESB instance, other operations can be used to track the performance as would be appreciated by one of ordinary skill in the art having the benefit of this disclosure. In one embodiment, the processing logic determines if the performance of the first ESB instance falls below the respective predetermined threshold by determining a performance of each of the services of the first ESB instance, and comparing the performance of each of the services against a service performance threshold. The performance of the first ESB instance falls below the predetermined threshold when at least one of the services of the first ESB instance falls below the respective performance threshold. Alternatively, the performance of the first ESB instance can be determined using other techniques as would be appreciated by one of ordinary skill in the art having the benefit of this disclosure. For example, the processing logic can determine the performance of the first ESB instance based on the collective performance of the services of the first ESB instance.

When the performance of the first ESB instance is below the threshold at block 408, the processing logic automatically deploys a second ESB instance having a set of one or more duplicative services of less than all of the services of the first ESB instance (block 410). For example, the processing logic can deploy the second ESB instance with only one duplicate service. Alternatively, the processing logic can deploy any combination of duplicate services of the first ESB instance. However, if the performance of the services is not below the respective thresholds at block 408, the processing logic returns to block 404 to regularly receive the reports from the first ESB instance. In another embodiment, if the processing logic deploys the second ESB service, the processing logic can start receiving regular reports from the second ESB instance as well.

In another embodiment, the processing logic at block 410 automatically deploys the second ESB instance having a duplicative service for only a first service of the first ESB instance that falls below a performance threshold. In another embodiment, the processing logic tracks the performance of the first and second instances and automatically deploys a third ESB instance having a set of one or more duplicate services of less than all of the services of the first ESB instance when the performance of at least one of the first and second ESB instances falls below the predetermined threshold. The predetermined threshold may be similar or dissimilar for the first and second ESB instance. In another embodiment, the processing logic automatically deploys a third ESB instance having a duplicate service for only a first service of the first ESB instance that falls below a performance threshold. In another embodiment, the processing logic automatically deploys a third ESB instance having the duplicate service for the first service and a second service of the first ESB instance. In another embodiment, the processing logic automatically deploys the second ESB instance with the duplicate service for the first service and a duplicative service for a third service, the third service being different than the second service of the third ESB instance. Alternatively, the processing logic can automatically deploy any number of ESB instances having any combination of individual services that are less than all of the available services of the first ESB service.

In one embodiment, the processing logic receives an incoming message to be processed by a given type of service, such as the first service of the first ESB instance and the duplicative service of the second ESB service. The processing logic tracks the performance of the first and second ESB instances, determines which of the first service and duplicative service has the highest performance to process the incoming message, and forwards the incoming message to the determined service that has the highest performance to process the incoming message.

Alternatively, the processing logic receives an incoming message to be processed by a given type of service, and forwards the incoming message to one of the ESB instances using other techniques as would be appreciated by one of ordinary skill in the art having the benefit of this disclosure, such as on a first-come-first-serve basis, or on a round robin basis, alternating between each of the ESB instances, for examples.

Figure 4B:
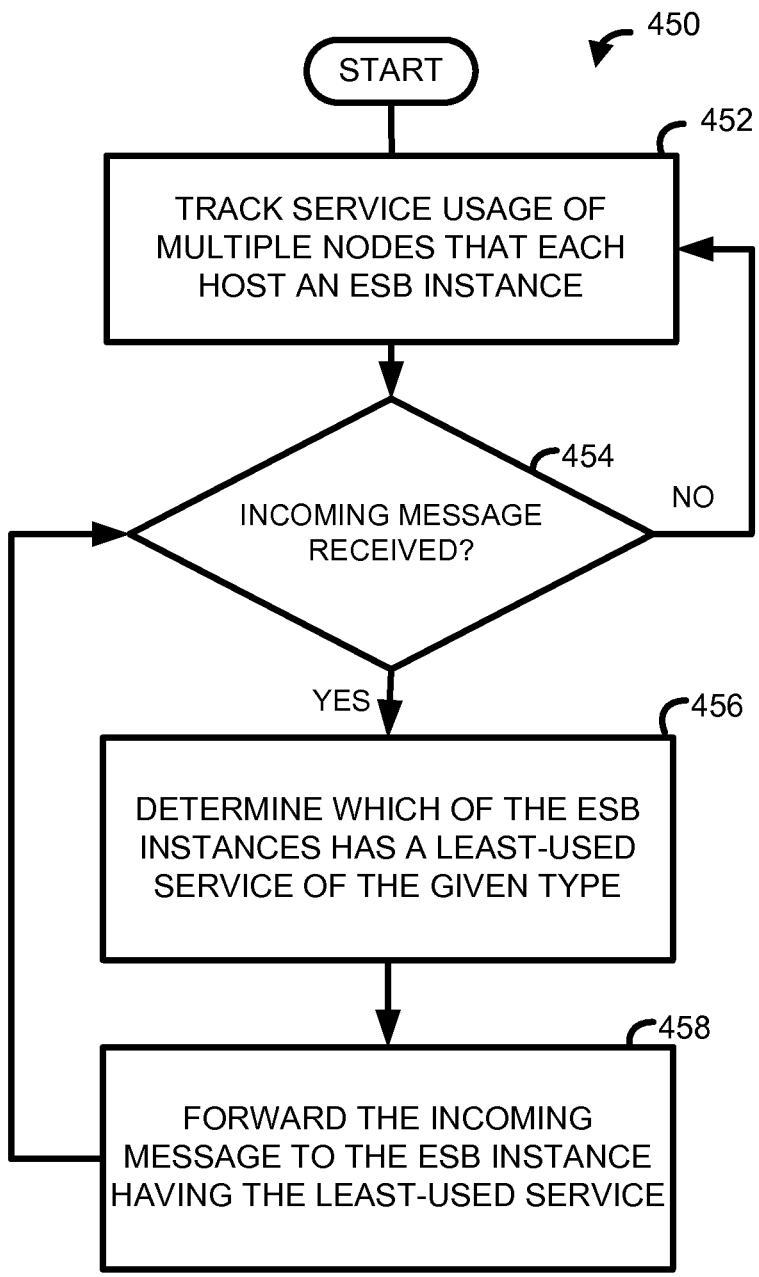
FIG. 4B is a flow diagram of one embodiment of a method of service-level ESB load balancing.

FIG. 4B is a flow diagram of one embodiment of a method 450 of service-level ESB load balancing. The method 450 is performed by processing logic that may comprise hardware (circuitry, dedicated logic, etc.), software (such as is run on a general purpose computing system or a dedicated machine), firmware (embedded software), or any combination thereof. In one embodiment, the service-level load balancer 224 of FIG. 2A performs the method 450. In another embodiment, the ESB load balancer 220 of FIG. 2A performs the method 450. Alternatively, other components of the server 204 can perform some or all of the operations of method 450.

Referring to FIG. 4B, processing logic begins with tracking service usage of multiple nodes that each host an ESB instance (block 452). Next, the processing logic detects whether an incoming message has been received (block 454). If no message has been received at block 454, the processing logic returns to block 452 to track the service usage. However, if an incoming message has been received at block 454, the processing logic determines which of the ESB instances has a least-used service of the given type (block 456), and forwards the incoming message to the ESB instance having the least-used service (block 458), and returns to see if another incoming message has been received at block 454.

In one embodiment, a first ESB instance has multiple services, such as a fixed number of services, and a second ESB instance has a set of one or more duplicate services of less than all of the multiple services of the first ESB instance. In this case, the second ESB instance has less than the fixed number of services, and may be one of the multiple services of the first ESB instance up to all but one of all of the fixed number of services. The duplicative services of the second instance may be any combination of services. For example, in one embodiment, the duplicative service of the second ESB instance is the only service deployed on the second ESB instance. In another embodiment, the second ESB instance only has the duplicative service and a second service. The second service may be a duplicative service of one of the services of the first ESB instance. Alternatively, the second service may be a different service than the services of the first ESB instance. In another embodiment, the third ESB service only has the duplicative service and a third servicer, the third service being different than the second service of the second ESB instance. The third service may be a duplicative service of one of the services of the first ESB instance. Alternatively, the third service may be a different service than the services of the first ESB instance. As described above, the services may include a transformation service, a registry service, a conversion service, or the like.

In one embodiment, the processing logic at block 456 determines which of the ESB instance has the least-used service by determining which of the plurality of nodes hosts a service of the given type. Next, the processing logic determines which of those determined nodes has the lowest resource utilization, and forwards the incoming message to the detected node that has the lowest resource utilization. In this embodiment, at block 458, the processing logic forwards the incoming message to the detected node that has the lowest resource utilization.

In another embodiment, the processing logic tracks the service usage at block 452 by regularly receiving a report from each of the multiple nodes. Each report contains a list of installed services on the respective node and corresponding utilization of the respective nodes' resources. In this embodiment, the processing logic determines which ESB instance has the least-used service by searching the reports for the installed service of the given type that has the lowest resource utilization, wherein the installed service having the lowest resource utilization is the service having the least-used service. In this embodiment, at block 458, the processing logic forwards the incoming message to the respective node hosting the service that has the lowest resource utilization.

Figure 5:
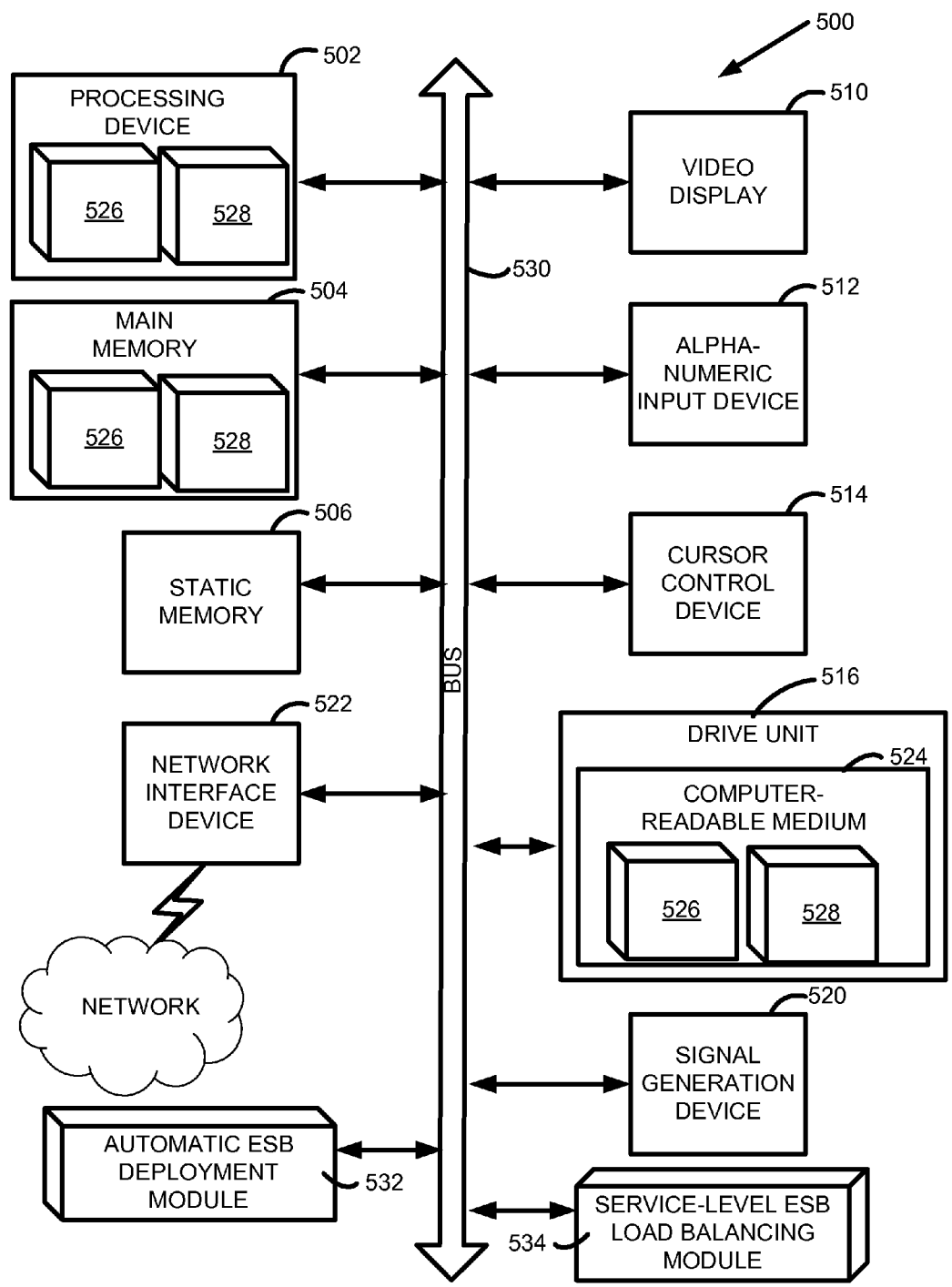
FIG. 5 illustrates a diagrammatic representation of a machine in the exemplary form of a computing system for automatic ESB deployment and service-level load balancing.

FIG. 5 illustrates a diagrammatic representation of a machine in the exemplary form of a computing system 500 for automatic ESB deployment and service-level load balancing. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for automatic ESB deployment and service-level load balancing, such as the methods 400 and 450 described above. In one embodiment, the computing system 500 represents various components that may be implemented in the server 204 as described above. Alternatively, the server 204 may include more or less components as illustrated in the computing system 500.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., automatic ESB deployment 526 and/or service-level ESB load balancing 528) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., automatic ESB deployment 526 and/or service-level ESB load balancing 528) embodying any one or more of the methodologies or functions described herein. The automatic ESB deployment 526 and/or service-level ESB load balancing 528 may also reside, completely or at least partially, within the main memory 504 and/or within the processing device 502 during execution thereof by the computing system 500, the main memory 504 and the processing device 502 also constituting computer-readable storage media. The automatic ESB deployment 526 and/or service-level ESB load balancing 528 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The automatic ESB deployment module 532 and/or service-level ESB load balancing module 534, components, and other features described herein (for example in relation to FIGS. 2A-2C and 3) can be implemented as discrete hardware components or integrated in the functionality of hardware components such as ASICS, FPGAs, DSPs, or similar devices. The automatic ESB deployment module 532 and/or service-level ESB load balancing module 534 may implement operations of either or both of the automatic ESB deployment engine 222 and the service-level ESB load balancer 224. In addition, the automatic ESB deployment module 532 and/or service-level ESB load balancing module 534 can be implemented as firmware or functional circuitry within hardware devices. Further, the automatic ESB deployment module 532 and/or service-level ESB load balancing module 534 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
monitoring, by a load balancer executed by a processing device, performance of individual services installed on an first enterprise service bus (ESB) node, wherein the performance comprises utilization metrics of the first ESB node's resources by the individual services;
determining by the load balancer that the performance of one or more of the individual services falls below a performance threshold;
deploying, by the load balancer, a duplicate service for the one or more of the individual services that falls below the performance threshold at one or more additional ESB nodes without user intervention;
monitoring, by the load balancer, additional performance of the individual services and the one or more duplicate services installed at the one or more additional ESB nodes, wherein the additional performance comprises second utilization metrics of the one or more additional ESB node's resources by the duplicate service for the one or more of the individual services;
determining by the load balancer that the additional performance of an additional one or more of the individual services and the one or more duplicate services falls below the performance threshold; and
deploying, by the load balancer, an additional duplicate service for the additional one or more of the individual services and the one or more duplicate services that falls below the performance threshold at one or more further ESB nodes without user intervention.

2. The method of claim 1, wherein the determining that the performance comprises:
receiving a report from the first ESB node, the report comprising a list of the individual services installed on the first ESB node and the utilization metrics;
determining the performance using the utilization metrics of the individual services; and
comparing the performance of each of the individual services against the performance threshold.

3. The method of claim 2, wherein the determining that the additional performance comprises:
receiving one or more additional reports from the one or more additional ESB nodes, the one or more additional reports comprising a list of the duplicate service for the one or more of the individual services deployed at the one or more additional ESB nodes and the second utilization metrics;
determining the additional performance using the second utilization metrics; and
comparing the additional performance against the performance threshold.

4. The method of claim 1, further comprising:
monitoring, by the load balancer, a third performance of the individual services and the one or more additional duplicate services installed at the at one or more further ESB nodes, wherein the third performance comprises third utilization metrics of the one or more further ESB node's resources by the one or more additional duplicate services;
determining by the load balancer that the third performance of an additional one or more of the individual services and the one or more additional duplicate services falls below the performance threshold; and
deploying, by the load balancer, an additional duplicate service for the additional one or more of the individual services and the one or more duplicate services that falls below the performance threshold at one or more further ESB nodes without user intervention.

5. The method of claim 1, further comprising:
receiving at the load balancer an incoming message to be processed by a given type of service;
determining which of the first ESB node and one or more additional ESB nodes has an individual service of the given type with a highest performance to process the incoming message; and
forwarding the incoming message to the individual service of the given type with the highest performance to process the incoming message.

6. The method of claim 1, wherein the individual services comprises a first service and a second service, wherein the first service falls below the performance threshold, wherein the duplicate service for the first service is deployed at a second ESB node of the one or more additional ESB nodes without user intervention, wherein no duplicate service for the second service is deployed at the second ESB node.

7. A method comprising:
repeatedly monitoring, by an load balancer executed by a processing device, performance of individual services installed on a plurality of enterprise service bus (ESB) nodes, wherein the performance is measured in view of utilization metrics of the individual services;
periodically determining by the load balancer whether the performance of one or more of the individual services falls below a performance threshold;
deploying, by the load balancer, a duplicate service for the one or more of the individual services that falls below the performance threshold at one or more additional ESB nodes without user intervention in response to the periodically determining;

determining by the load balancer whether the performance of one or more of the individual services and the duplicate service falls below the performance threshold; and deploying, by the load balancer, another duplicate service for the one or more of the individual services and the duplicate service that falls below the performance threshold at one or more additional ESB nodes without user intervention in response to the determining.

8. The method of claim 7, wherein the repeatedly monitoring comprises:

regularly receiving reports from the plurality of ESB nodes, wherein the reports comprise the utilization metrics of the individual services; and determining the performance of the individual services from the reports, wherein the periodically determining comprises comparing the performance of the individual services against the performance threshold.

9. The method of claim 7, receiving at the load balancer an incoming message to be processed by a given type of service;

determining which of the plurality of ESB nodes has an individual service of the given type with a highest performance to process the incoming message; and forwarding the incoming message to the individual service of the given type with the highest performance to process the incoming message.

10. The method of claim 7, wherein the individual services comprises a first service and a second service, wherein the first service falls below the performance threshold, wherein the duplicate service for the first service is deployed at a second ESB node of the one or more additional ESB nodes without user intervention, wherein no duplicate service for the second service is deployed at the second ESB node.

11. A non-transitory computer readable storage medium including instructions that, when executed by a processing device, cause the processing device to:

monitor, by a load balancer executed by the processing device, performance of individual services installed on an first enterprise service bus (ESB) node, wherein the performance comprises utilization metrics of the first ESB node's resources by the individual services;

determine by the load balancer that the performance of one or more of the individual services falls below a performance threshold;

deploy, by the load balancer, a duplicate service for the one or more of the individual services that falls below the performance threshold at one or more additional ESB nodes without user intervention;

monitor, by the load balancer, additional performance of the individual services and the one or more duplicate services installed at the one or more additional ESB nodes, wherein the additional performance comprises second utilization metrics of the one or more additional ESB node's resources by the duplicate service for the one or more of the individual services;

determine by the load balancer that the additional performance of an additional one or more of the individual services and the one or more duplicate services falls below the performance threshold; and deploy, by the load balancer, an additional duplicate service for the additional one or more of the individual services and the one or more duplicate services that falls below the performance threshold at one or more further ESB nodes without user intervention.

12. The non-transitory computer readable storage medium of claim 11, wherein, to determine that the performance of the one or more of the individual services falls below the performance threshold, the processing device is to:

receive a report from the first ESB node, the report comprising a list of the individual services installed on the first ESB node and the utilization metrics;

determine the performance using the utilization metrics of the individual services; and compare the performance of each of the individual services against the performance threshold.

13. The non-transitory computer readable storage medium of claim 12, wherein, to determine that the additional performance of the additional one or more of the individual services and the one or more duplicate services falls below the performance threshold, the processing device is to:

receive one or more additional reports from the one or more additional ESB nodes, the one or more additional reports comprising a list of the duplicate service for the one or more of the individual services deployed at the one or more additional ESB nodes and the second utilization metrics;

determine the additional performance using the second utilization metrics; and compare the additional performance against the performance threshold.

14. The non-transitory computer readable storage medium of claim 11, wherein the processing device is further to:

monitor, by the load balancer, a third performance of the individual services and the one or more additional duplicate services installed at the at one or more further ESB nodes, wherein the third performance comprises third utilization metrics of the one or more further ESB node's resources by the one or more additional duplicate services;

determine by the load balancer that the third performance of an additional one or more of the individual services and the one or more additional duplicate services falls below the performance threshold; and deploying, by the load balancer, an additional duplicate service for the additional one or more of the individual services and the one or more duplicate services that falls below the performance threshold at one or more further ESB nodes without user intervention.

15. The non-transitory computer readable storage medium of claim 11, wherein the processing device is further to:

receive at the load balancer an incoming message to be processed by a given type of service;

determine which of the first ESB node and one or more additional ESB nodes has an individual service of the given type with a highest performance to process the incoming message; and forward the incoming message to the individual service of the given type with the highest performance to process the incoming message.

16. The non-transitory computer readable storage medium of claim 11, wherein the individual services comprises a first service and a second service, wherein the first service falls below the performance threshold, wherein the duplicate service for the first service is deployed at a second ESB node of the one or more additional ESB nodes without user intervention, wherein no duplicate service for the second service is deployed at the second ESB node.

* * * * *